US009229458B2

(12) United States Patent
Hawkins et al.

(10) Patent No.: US 9,229,458 B2
(45) Date of Patent: Jan. 5, 2016

(54) DYNAMIC PRESSURE REGISTRATION DEVICE FOR INTERNALLY REGISTERED ACTUATORS AND OVER PRESSURE PROTECTION DEVICES

(71) Applicant: EMERSON PROCESS MANAGEMENT REGULATOR TECHNOLOGIES, INC., McKinney, TX (US)

(72) Inventors: James Chester Hawkins, Allen, TX (US); David Blair Davis, Whitewright, TX (US); Justin Lane Masias, Tom Bean, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/042,484

(22) Filed: Sep. 30, 2013

(65) Prior Publication Data
US 2014/0090726 A1 Apr. 3, 2014

Related U.S. Application Data

(60) Provisional application No. 61/708,530, filed on Oct. 1, 2012.

(51) Int. Cl.
*G05D 16/06* (2006.01)
*F16K 31/165* (2006.01)
*G01F 1/46* (2006.01)

(52) U.S. Cl.
CPC .......... *G05D 16/0694* (2013.01); *F16K 31/165* (2013.01); *G01F 1/46* (2013.01);
(Continued)

(58) Field of Classification Search
CPC .... G01F 1/46; G05D 16/0602; G05D 16/063; G05D 16/0675; G05D 16/0683; G05D 16/0686; G05D 16/0688; G05D 16/0694; Y10T 137/7795; Y10T 137/7796; Y10T 137/7809; Y10T 137/7812; Y10T 137/7818; Y10T 137/7819; Y10T 137/7831; F16K 31/165
USPC ............ 137/505.12, 505.18, 505.26, 505.29, 137/505.34, 505.36, 505.47; 73/1.29, 73/1.57–1.71, 861.65–861.67
See application file for complete search history.

(56) References Cited

U.S. PATENT DOCUMENTS 2,554,634 A * 5/1951 Paine et al. ................ 73/861.65
2,599,577 A * 6/1952 Norgren .................... 137/484.8
(Continued)

FOREIGN PATENT DOCUMENTS

JP H09 242998 A 9/1997
WO WO-98/10249 A1 3/1998

OTHER PUBLICATIONS

International Search Report and Written Opinion for corresponding International application No. PCT/US2013/062796 dated Dec. 6, 2013.

*Primary Examiner* — William McCalister
(74) *Attorney, Agent, or Firm* — Marshall, Gerstein & Borun LLP

(57) ABSTRACT

A fluid regulating device includes a regulator valve having an inlet, an outlet, and a valve port disposed between the inlet and the outlet. An actuator is coupled to the regulator valve and includes a valve disc that displaces between a closed position and an open position. The device also includes an overpressure protection device adapted to stop flow from the inlet to the outlet when pressure in a control cavity reaches a predetermined level. The overpressure protection device includes a sensing tube having a first end in fluid communication with the control cavity and a second end in fluid communication with the outlet. The sensing tube has a first portion extending parallel to the flow axis. One or more apertures are disposed in the sensing tube adjacent to the second end, and each of the apertures has a centerline that is perpendicular to the flow axis.

6 Claims, 5 Drawing Sheets

(52) U.S. Cl.
CPC ......... *G05D 16/0602* (2013.01); *G05D 16/063* (2013.01); *G05D 16/0683* (2013.01); *Y10T 137/7795* (2015.04); *Y10T 137/7796* (2015.04); *Y10T 137/7809* (2015.04); *Y10T 137/7812* (2015.04); *Y10T 137/7818* (2015.04); *Y10T 137/7819* (2015.04); *Y10T 137/7831* (2015.04)

(56) References Cited

U.S. PATENT DOCUMENTS

| | | | |
|---|---|---|---|
| 2,619,983 A * | 12/1952 | Roberts | 137/484.8 |
| 3,086,548 A * | 4/1963 | Galiger et al. | 137/484.8 |
| 3,424,194 A * | 1/1969 | Hetz et al. | 137/461 |
| 3,673,866 A | 7/1972 | Alperovich et al. | |
| 3,722,536 A * | 3/1973 | Hill et al. | 137/505.46 |
| 3,742,972 A * | 7/1973 | Hughes | 137/110 |
| 3,981,193 A * | 9/1976 | Goulet | 73/861.66 |
| 4,559,836 A * | 12/1985 | Coleman et al. | 73/861.66 |
| 4,696,194 A * | 9/1987 | Taylor | 73/861.66 |
| 4,754,651 A * | 7/1988 | Shortridge et al. | 73/861.42 |
| 5,123,288 A * | 6/1992 | Tench et al. | 73/861.66 |
| 5,285,810 A * | 2/1994 | Gotthelf | 137/340 |
| 5,319,970 A * | 6/1994 | Peterson et al. | 73/182 |
| 5,458,006 A * | 10/1995 | Roqueta | 73/861.42 |
| 6,923,197 B2 * | 8/2005 | Vitale | 137/12 |
| 6,928,884 B1 * | 8/2005 | Pearson | 73/861.42 |
| 2004/0237641 A1 | 12/2004 | Hanson et al. | |
| 2008/0257418 A1 | 10/2008 | Kranz et al. | |
| 2009/0260697 A1 * | 10/2009 | Mevius et al. | 137/484.2 |
| 2009/0261281 A1 | 10/2009 | Mevius et al. | |

\* cited by examiner

DYNAMIC PRESSURE REGISTRATION DEVICE FOR INTERNALLY REGISTERED ACTUATORS AND OVER PRESSURE PROTECTION DEVICES

FIELD OF THE INVENTION

The present invention relates to fluid flow regulating devices such as gas regulators and, more particularly, to gas regulators having a system to prevent unsafe downstream pressure conditions.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced trim to improve the reaction of the gas regulator to variations in the downstream pressure. The balanced trim is adapted to reduce the influence of the upstream pressure on the performance of the gas regulator. The upstream pressure is placed in fluid communication with a balancing diaphragm to apply a force to the control element of the gas regulator in the opposite direction as the force of the downstream pressure. Accordingly, as the upstream pressure varies, a corresponding force is applied to balance the force created by the upstream pressure as described further below so that the gas regulator acts in response to the downstream pressure only.

Some conventional gas regulators also include secondary monitoring devices (overpressure protection devices), such as overpressure monitoring devices, slam shut devices, token alarms and the like, that perform a responsive action if a sensed input pressure, such as a pressure downstream of the regulator, varies from a predetermined normal operating pressure range. An overpressure protection device controls the pressure downstream of the regulator in the event that the regulator fails, thereby allowing the downstream pressure to increase to undesired levels. In the event the regulator fails and the downstream pressure rises above a predetermined monitor setpoint pressure, the overpressure protection device operates to close the valve port of the regulator valve and cut off the flow of gas to the downstream components of the gas distribution system. As demand increases and/or the problem with the regulator is resolved and the downstream pressure drops, the overpressure protection device opens the valve port and thereby allows gas flow downstream.

Typically, an overpressure protection device, such as an overpressure monitoring device, responds in the event that the downstream pressure (i.e., pressure in the outlet) exceeds a cutoff pressure that is sensed by a diaphragm. Specifically, a bottom surface of the diaphragm of the overpressure monitor partially defines a control cavity such that pressure in the control cavity acts on the diaphragm. In one embodiment of an overpressure monitoring device, a control line extends from the control cavity to a portion of the outlet of the regulator valve, and the control line is disposed external to a both a housing of the overpressure monitoring device and portion of the regulator valve defining the valve outlet. So configured, downstream pressure is accurately communicated to the control cavity. However, such a configuration may be expensive to install and maintain.

Alternatively, overpressure protection devices may include an internal sense tube that extends from the control cavity to the outlet of the regulator valve and that is disposed through internal portions of the housing of the overpressure protection device and a portion of the body of the regulator valve defining the valve outlet. The internal sense tube may have a generally cylindrical shape having a constant cross-section. The internal sense tube may also have an open terminal end that extends into the regulator valve outlet, and the pressure of the fluid flowing within the valve at or adjacent to the outlet is sensed through the open terminal end of the internal sense tube. A portion of the internal sense tube that includes the terminal end may extend obliquely into the outlet or may extend parallel to the general direction of fluid flow through the outlet. However, as flow velocities and/or flow demand changes, the pressure communicated to the control cavity by the internal sense tube may correspondingly vary. Typically, a pressure lower than the actual control pressure is communicated to the control cavity via the open terminal end of the internal sense tube, thereby artificially driving the valve to induce boost in regulating pressures. More specifically, as flow passes over the end of the internal sense tube, a low pressure zone is created at the open terminal end which results in the registered pressure being lower than the actual pressure. As a result, the accuracy of the pressure measurement changes as the flow rate changes, thereby negatively impacting the ability of the overpressure protection device to protect the downstream system.

SUMMARY

In accordance with one exemplary aspect of the present invention, a fluid regulating device includes a regulator valve having a valve body defining an inlet and an outlet. The regulator valve further includes a valve port disposed between the inlet and the outlet. An actuator is coupled to the regulator valve and the actuator includes a valve disc, the valve disc disposed within the regulator valve and adapted for displacement between a closed position sealingly engaging the valve port and an open position disposed away from the valve port. In the open position, fluid flowing from the inlet to the outlet flows through the outlet along a flow axis. The fluid regulating device also includes an overpressure protection device adapted to stop flow from the inlet to the outlet when pressure in a control cavity reaches a predetermined level. The overpressure protection device includes a sensing tube, and the sensing tube has a second end in fluid communication with the control cavity and a first end in fluid communication with the outlet of the of the regulator valve such that the control cavity is in fluid communication with the outlet of the of the regulator valve. A first portion of the sensing tube extends along a tube axis that is parallel to the flow axis, and the first portion extends from a first point disposed between the first end and the second end and a second point disposed at the first end. One or more apertures are disposed in the sensing tube adjacent to the first end, and each of the one more apertures has a centerline that is perpendicular to the flow axis.

In accordance with a further exemplary aspect of the present invention, a fluid regulating device includes a regulator valve having a valve body defining an inlet and an outlet. The regulator valve further includes a valve port disposed between the inlet and the outlet. An actuator is coupled to the regulator valve and the actuator includes a valve disc, the valve disc disposed within the regulator valve and adapted for displacement between a closed position sealingly engaging the valve port and an open position disposed away from the valve port. In the open position, fluid flowing from the inlet to the outlet flows through the outlet along a flow axis. The fluid regulating device also includes an overpressure protection device adapted to stop flow from the inlet to the outlet when pressure in a control cavity reaches a predetermined level. The overpressure protection device includes a sensing tube, and the sensing tube has a second end in fluid communication with the control cavity and a first end in fluid communication with the outlet of the of the regulator valve such that the control cavity is in fluid communication with the outlet of the of the regulator valve. A first portion of the sensing tube extends along a tube axis that is parallel to the flow axis, and the first portion extends from a first point disposed between the first end and the second end and a second point disposed at the first end. The sensing tube includes a first segment of the first portion having a first diameter and a second segment of the first portion having a second diameter, wherein the first diameter is larger than the second diameter.

DETAILED DESCRIPTION

Figure 1:
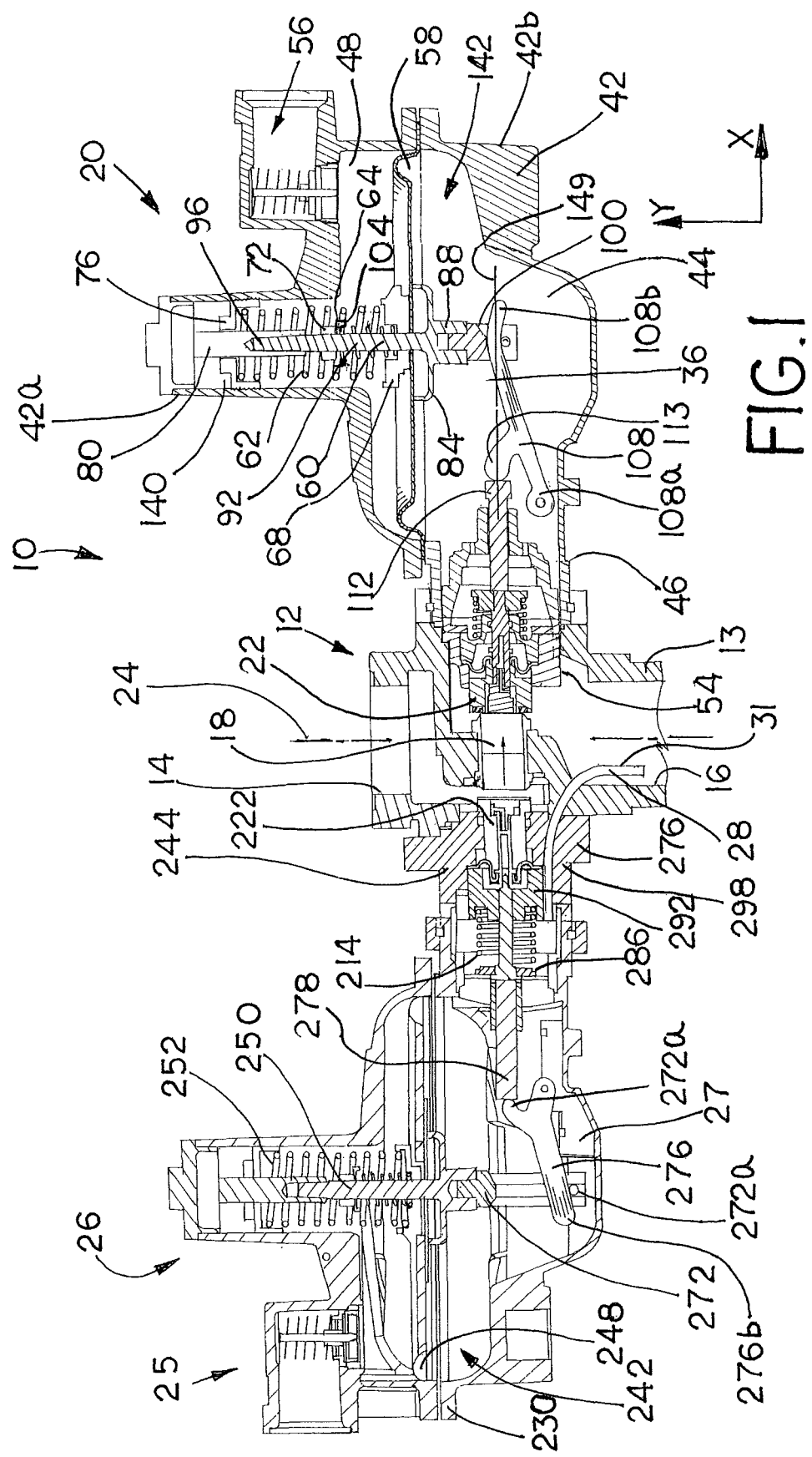
FIG. 1 is a side cross-sectional view of an embodiment of a fluid regulating device in an open position, the fluid regulating device including an overpressure protection device.
Figure 2:
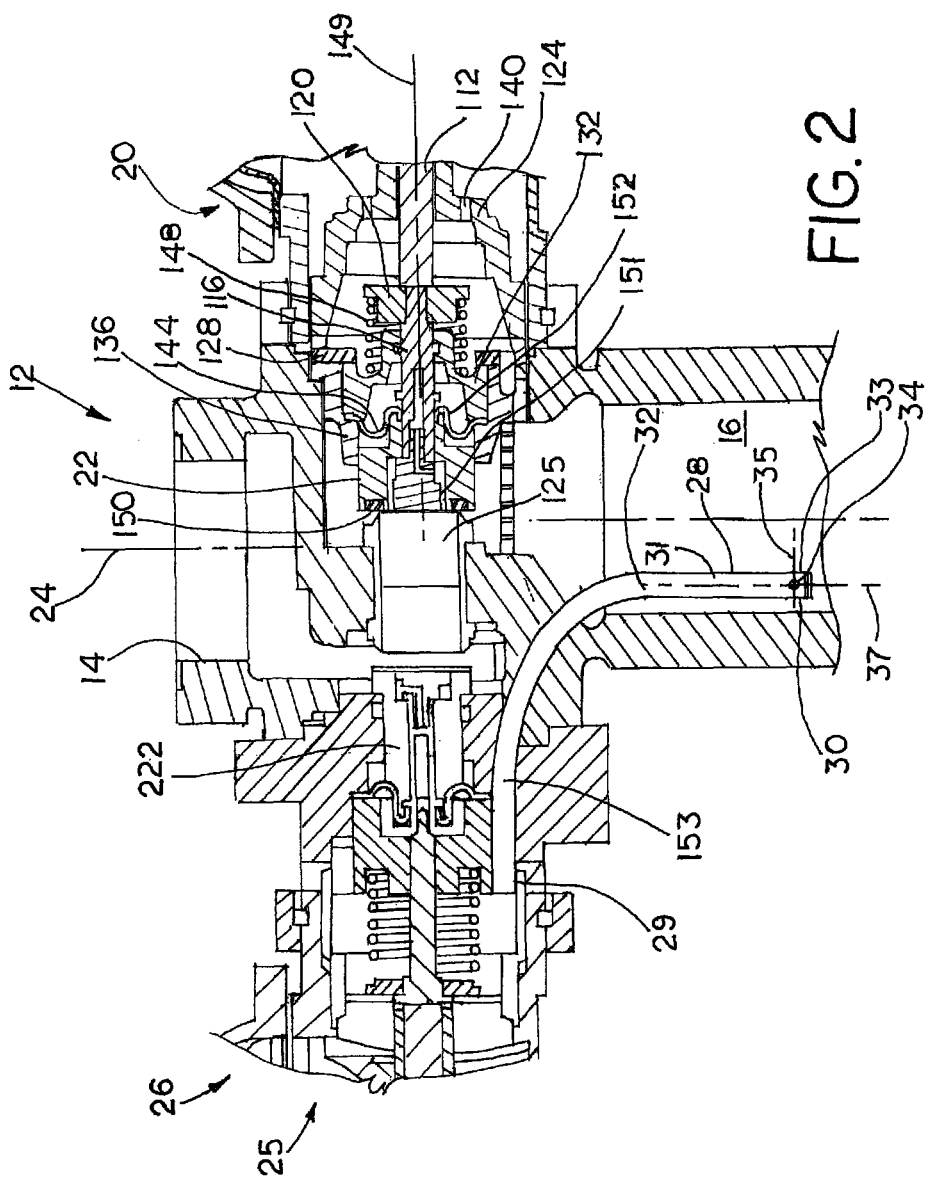
FIG. 2 is a partial side cross-sectional view of the valve disc and sensing tube of the fluid regulating device of FIG. 1, the fluid regulating device in a closed position.

FIGS. 1 and 2 illustrate a fluid regulating device 10 including a regulator valve 12 having a valve body 13 defining an inlet 14 and an outlet 16. The regulator valve 10 further includes a valve port 18 disposed between the inlet 14 and the outlet 16. An actuator 20 is coupled to the regulator valve 12 and the actuator 20 includes a valve disc 22, the valve disc disposed within the regulator valve 12 and adapted for displacement between a closed position sealingly engaging the valve port 18 and an open position disposed away from the valve port 18. In the open position, fluid flowing from the inlet 14 to the outlet flows through the outlet along a flow axis 24. The fluid regulating device 10 also includes an overpressure protection device 25 (such as an overpressure monitor 26) adapted to stop flow from the inlet 14 to the outlet 16 when pressure in a control cavity 27 rises or falls to a predetermined level.

As illustrated in FIG. 2, the overpressure protection device 25 includes a sensing tube 28, and the sensing tube 28 has a second end 29 in fluid communication with the control cavity 27 and a first end 30 in fluid communication with the outlet 16 of the of the regulator valve 12 such that the control cavity 27 is in fluid communication with the outlet 16 of the of the regulator valve 12. A first portion 31 of the sensing tube 28 extends along a tube axis 37 that is parallel to the flow axis 24, and the first portion 31 extends from a first point 32 disposed between the second end 29 and the first end 30 and a second point 33 disposed at the first end 30. One or more apertures 34 are disposed in the sensing tube 28 adjacent to the first end 30, and each of the one more apertures 34 has a centerline 35 that is perpendicular to the flow axis 24. So configured, pressure normal to the flow tube is communicated to the control cavity 27, thereby eliminating the low pressure zone that results in the inaccurate registration of pressure. As a result, the pressure registered by the overpressure protection device 25 is accurate and is not affected by variations in flow velocities and flow demand.

Turning to the fluid regulating device 10 in more detail, the fluid regulating device 10 includes the actuator 20 and the regulator valve 12, as illustrated in FIGS. 1 and 2. The regulator valve 12 includes the inlet 14 for receiving gas from a gas distribution system, for example, and the outlet 16 for delivering gas to a facility having one or more appliances, for example. The actuator 20 is coupled to the regulator valve 12 and includes a control assembly 36 having a control element, such as a valve disc 22. During a first or normal operational mode, the control assembly 36 senses the pressure at the outlet 16 of the regulator valve 12 (i.e., the outlet pressure) and controls a position of the valve disc 22 such that the outlet pressure approximately equals a predetermined setpoint or control pressure.

With reference to FIGS. 1 and 2, the regulator valve 12 defines a throat 38 and a valve mouth 40. The throat 38 is disposed between the inlet 14 and the outlet 16, and has the valve port 18 disposed therein. Fluid must travel through the valve port 18 to travel between the inlet 14 and the outlet 16 of the regulator valve 12. The valve port 18 may be removable from the regulator valve 12 such that it may be replaced with a different valve port having a bore of a different diameter or configuration to tailor operational and flow characteristics of the regulator valve 12 to a specific application. In the disclosed embodiment, the valve mouth 40 defines an opening disposed along an axis that is generally parallel to a horizontal (i.e., extending along or parallel to the X axis of the reference coordinate system provided in FIG. 1) longitudinal axis 149 and that may be perpendicular or substantially perpendicular to the vertical (i.e., extending along or parallel to the Y axis of the reference coordinate system provided in FIG. 1) flow axis 24 aligned or substantially aligned with the general direction of fluid flow through the inlet 14 and outlet 16 of the regulator valve 12.

Referring to FIG. 1, the actuator 20 includes a housing 42 and the control assembly 36, as discussed above. The housing 42 includes an upper housing component 42a and a lower housing component 42b secured together with a plurality of fasteners, for example. The lower housing component 42b defines a control cavity 44 and an actuator mouth 46. The actuator mouth 46 is connected to the valve mouth 40 of the regulator valve 12 to provide fluid communication between the actuator 20 and the regulator valve 12. The upper housing component 42a defines a relief cavity 48 and a tower portion 50 for accommodating a portion of the control assembly 36, as will be described.

The control assembly 36 includes a diaphragm subassembly 52, a disc and balancing subassembly 54, and a release valve 56. The diaphragm subassembly 52 includes a diaphragm 58, a piston 60, a control spring 62, a relief spring 64, a combination spring seat 68, a relief spring seat 72, a control spring seat 76, and a piston guide 80. More particularly, the diaphragm 58 includes a disc-shaped diaphragm defining an opening through a central portion thereof. The diaphragm 58 is constructed of a flexible, substantially air-tight, material and its periphery is sealingly secured between the upper and lower housing components 42a, 42b of the housing 42. The diaphragm 58 therefore separates the relief cavity 48 from the control cavity 44.

The combination spring seat 68 is disposed on top of the diaphragm 58 and defines an opening disposed concentric with the opening in the diaphragm 58. As depicted in FIG. 1, the combination spring seat 68 supports the control spring 62 and the relief spring 64.

The piston 60 of the disclosed embodiment includes a generally elongated rod-shaped member having a sealing cup portion 84, a yoke 88, a threaded portion 92, and a guide portion 96. The sealing cup portion 84 is concaved and generally disc-shaped and extends circumferentially about a mid-portion of the piston 60, and is located just below the diaphragm 58. The yoke 88 includes a cavity adapted to accommodate a coupler 100 that connects to a portion of the disc and balancing subassembly 54 to enable attachment between the diaphragm subassembly 52 and the disc and balancing subassembly 54, as will be described.

The guide portion 96 and the threaded portion 92 of the piston 60 are disposed through the openings in the diaphragm 58 and the combination spring seat 68, respectively. The guide portion 96 of the piston 60 is slidably disposed in a cavity in the piston guide 80, which maintains the axial alignment of the piston 60 relative to the remainder of the control assembly 36. The relief spring 64, the relief spring seat 72, and a nut 104 are disposed on the threaded portion 92 of the piston 60. The nut 104 retains the relief spring 64 between the combination spring seat 68 and the relief spring seat 72. The control spring 62 is disposed on top of the combination spring seat 68, as mentioned, and within the tower portion 50 of the upper housing component 42a. The control spring seat 74 is threaded into the tower portion 50 and compresses the control spring 62 against the combination spring seat 68. In the disclosed embodiment, the control spring 62 and the relief spring 64 include compression coil springs. Accordingly, the control spring 62 is grounded against the upper housing component 42a and applies a downward force to the combination spring seat 68 and the diaphragm 58. The relief spring 64 is grounded against the combination spring seat 68 and applies an upward force to the relief spring seat 72, which in turn is applied to the piston 60. In the disclosed embodiment, the force generated by the control spring 62 is adjustable by adjusting the position of the control spring seat 74 in the tower portion 50, and therefore the control pressure of the regulator 10 is also adjustable.

The control spring 62 acts against the pressure in the control cavity 44, which is sensed by the diaphragm 58. As stated, this pressure is the same pressure as that which exists at the outlet 16 of the regulator valve 12. Accordingly, the force applied by the control spring 62 sets the outlet pressure to a desired setpoint or control pressure for the regulator 10. The diaphragm subassembly 52 is operably coupled to the valve disc 22 and balancing subassembly 54, as mentioned above, via the yoke 88 of the piston 60 and the coupler 100, and by a control arm 108.

The disc and balancing subassembly 54 includes an actuator stem 112 that is engaged by the control arm 108 to move the valve disc 22 between the open and closed positions as the diaphragm 58 flexes due to variations in the downstream pressure. Specifically, the actuator stem 112 is a generally linear rod having an end surface engaged by the control arm 108. The control arm 108 is a slightly curved rod and includes a fulcrum end 108a and a free end 108b. The fulcrum end 108a is pivotally coupled to the lower housing component 130b and includes a finger 113 having a rounded end and engaging the end surface of the actuator stem 112. The free end 108b is received between a top portion and a pin of the coupler 100 that is attached to the yoke 88 of the piston 60. Thus, the coupler 100 and the control arm 108 operably connect the disc and balancing subassembly 54 to the diaphragm subassembly 52.

As illustrated in FIG. 2, the valve disc 22 of the disc and balancing subassembly 54 is operatively connected to the actuator stem 112, and includes a sealing surface 150 that engages the outlet of the valve port 18 to cut off the fluid flow through the regulator valve 12. The sealing surface 150 may be a portion of the valve disc 22 itself, or may be a portion of a sealing insert secured within a cavity formed in the valve disc 22. The sealing surface 150 may include any suitable material or combination of materials, such as a resilient, compressible material.

The valve disc 22 may be directly or indirectly connected to the actuator stem 112 by a balanced port stem 116 (that is secured to the valve disc 22) and a balancing spring seat 120, and the combined elements are supported for linear movement by a stem guide 124, a retainer plate 128, a balancing diaphragm retainer 132 and a balancing port housing 136. The stem guide 124 is configured to fit within the actuator mouth 46, and includes a generally cylindrical inner portion that slidably retains the actuator stem 112. The stem guide 124 further includes channels 140 therethrough forming a portion of the path placing the outlet 16 in fluid communication with control cavity 44 as discussed further below.

Referring to FIG. 2, the stem guide 124 engages the retainer plate 128, which is disposed between the stem guide 124 and balanced port housing 136, to hold the retainer plate 128 and balanced port housing 136 in place within the valve mouth 126. The retainer plate 128 is generally circular and includes a central opening through which the balanced port stem 116 passes. The balanced port housing 136 is generally cylindrical and hollow, extends toward the valve port 18, and has an inner diameter sized to slidably receive the valve disc 22. The diaphragm retainer 132 is disposed within the balanced port housing 136 and the opening of the retainer plate 128, and is held in place between a surface of the retainer plate 128 and an inner shoulder of the balanced port housing 136. A disc-shaped balancing diaphragm 144 having a central opening is provided within the balanced port housing 136. The balancing diaphragm 144 is constructed of a flexible, substantially air-tight, material and its periphery is secured between the diaphragm retainer 132 and the balanced port housing 136. The inner edge at the central opening of the balancing diaphragm 144 is sealingly secured between the valve disc 22 and the balanced port stem 116. So configured, a first cavity 152 is formed between a portion of the valve disc 22, the diaphragm retainer 132, and a surface of the balancing diaphragm 144.

The valve disc 22, the balanced port stem 116 secured to the valve disc 22, and the actuator stem 112 may be biased toward the open position of the regulator valve 12 by a balancing spring 148 disposed between the balancing spring seat 120 and a seating surface of the diaphragm retainer 132. More specifically, the seating surface of the diaphragm retainer 132 may be adapted to seat a first end of the balancing spring 148 and a second end of the balancing spring 148 may be adapted to engage a portion of the balancing spring seat 120, as illustrated in FIG. 2. The balancing spring 148 may be any suitable resilient member, such as a coil spring that is coaxially aligned with the longitudinal axis 24. Because the seating surface of the diaphragm retainer 132 is stationary, the second end of the balancing spring 148 biases the balancing spring seat 120 into engagement with the actuator stem 112. The balancing spring 148 may be pre-stressed to provide a suitable biasing force regardless of the position of the actuator stem 112. Moreover, the balancing spring 148 may be chosen from a plurality of balancing springs that each have a unique spring characteristics (e.g., spring force) to tune the disc and balancing subassembly 54 to achieve desired flow conditions.

As illustrated in FIG. 2, the valve disc 22 of the disc and balancing subassembly 54 includes the sealing surface 150 disposed at a first end of the valve disc 22. The valve disc 22 may further include one or more disc passages 151 that may longitudinally extend through the valve disc 22 from the first end to a longitudinally opposite second end such that the first cavity 152 is in fluid communication with the area adjacent to the outlet 125 of the valve port 18. The one or more disc passages 151 may be formed as a combination of one or more cylindrical passageways and one or more planar passageways that extend through the valve disc 22. In addition, one or more of the disc passages 151 may at least partially include elongated longitudinal passageways having any suitable cross-sectional shape (such as round, oval, or polygonal, for example).

With the valve disc 22 in the open position, fluid flows through the one or more disc passages 155 from the outlet 125 of the valve port 18 into the first cavity 152 and into contact with the balancing diaphragm 144. As such, the one or more disc passages 151 are configured to place the surface of the balancing diaphragm 144 opposite the valve port 18 in fluid communication with the upstream pressure bearing on the valve disc 22. Accordingly, the balancing diaphragm 144 provides a force on the valve disc 22 in the direction of the valve port 18 to compensate for the force applied to the valve disc 22 due to the upstream pressure of the fluid passing through the valve port 18. The components of the disc and balancing subassembly 54 are configured so that the force applied by the balancing diaphragm 144 is approximately opposite and equal to the force of the upstream pressure on the valve disc 22 to eliminate any influence of the upstream pressure on the diaphragm subassembly 52 and thereby allowing for more accurate control of the downstream pressure by the fluid regulating device 10.

As illustrated in FIG. 1, the fluid regulating device 10 may also include a secondary device in the form of an overpressure protection device 25 that operates to cut off the fluid flow through the regulator valve 12 in an overpressure situation until the downstream pressure is reduced after a failure of the actuator 20. As would be understood by one having ordinary skill in the art, the overpressure protection device 25 may be an overpressure monitoring device, a slam shut device, a token alarm, or any similar device known in the art that operates to cut off the fluid flow through a valve 12 in an overpressure situation until the downstream pressure is reduced after a failure of the actuator 20

For example, as illustrated in FIG. 2, the overpressure protection device 25 may be an overpressure monitor 26 that has a configuration similar to the actuator 20, and the overpressure monitor 26 also operates in a similar manner as the actuator 20. Because the overpressure monitor 26 only responds in the event that the downstream pressure (i.e., pressure in the outlet 16) exceeds a cutoff pressure established by a diaphragm 248 and a control spring 252, a monitor diaphragm subassembly 242 and a disc and balancing subassembly 244 are configured accordingly. A bottom surface of the diaphragm 248 of the overpressure monitor 26 partially defines the control cavity 27 such that pressure in the control cavity 27 acts on the diaphragm 248, and the control cavity 27 is in fluid communication with the outlet 16 of the regulator valve 12 via the sensing tube 28 to allow the downstream pressure to act on the diaphragm 248.

As illustrated in FIGS. 1 and 2, the sensing tube 28 (i.e., a piezometer tube) of the overpressure monitor 26 may be formed as a cylindrical tube or may be partially formed of a cylindrical tube. However, the sensing tube 28 may have any suitable cross-sectional shape or combination of shapes, such as that of an oval or polygon, for example. The sensing tube 28 may be formed as a single, unitary part, or may include two or more sub-component parts that are secured together to form the sensing tube 28. The sensing tube 28 may have any suitable thickness or thicknesses, and the sensing tube 28 may be made of any suitable material or combination of materials (e.g., steel, brass, aluminum, etc.).

Still referring to FIGS. 1 and 2, the second end 29 of the sensing tube 28 is in fluid communication with the control cavity 27 and the first end 30 of the sensing tube 28 is in fluid communication with the outlet 16 of the of the regulator valve 12. So configured, the control cavity 27 is in fluid communication with the outlet 16 of the of the regulator valve 12. The sensing tube 28 may have a first portion 31 that extends along a tube axis 37 that is parallel to or substantially parallel to the vertical flow axis 24. The first portion 31 extends from a first point 32 (disposed between the second end 29 of the sensing tube 28 and the first end 30 of the sensing tube 28) and a second point 33 (disposed at the first end 30 of the sensing tube), and the first point 32 is downstream of the first end 30. The first portion 31 may be disposed entirely within the outlet 16 of the regulator valve 12 or the first portion 31 may at least partially extend into a segment of pipe secured to the outlet 16.

The sensing tube 28 may have a second portion 153 that extends from the second end 29 of the sensing tube 28 to the first point 32 of the first portion 31 of the sensing tube 28. The second portion 153 may have any suitable shape or combination of shapes that allows the second end 29 of the sensing tube 28 to be in fluid communication with the control cavity 27 and that allows the second portion 153 to extend to the first point 32 of the first portion 31 of the sensing tube 28. For example, the second portion 153 may have a curved or substantially curved shape when viewed in cross section. Alternatively, one or more linear segments or one or more rounded or curved segments may cooperate to form the second portion 153. The second portion 153 may at least partially extend through the housing 230 of the overpressure monitor 26 at or adjacent to the interface between the overpressure monitor 26 and the actuator valve 12. The second portion 153 may also at least partially extend through a portion of the valve body 13 of the actuator valve 12 that defines the outlet 16. The second portion 153 may also be defined as a channel (or a tube disposed within a channel) extending through the housing 230 of the overpressure monitor 26 and/or the valve body 13 of the actuator valve 12 that defines the outlet 16 (or that is adjacent to the outlet 16), and the first portion 31 may be secured to a portion of the valve body 13 of the actuator valve 12 that defines the outlet 16 (or that is adjacent to the outlet 16).

Figure 3:
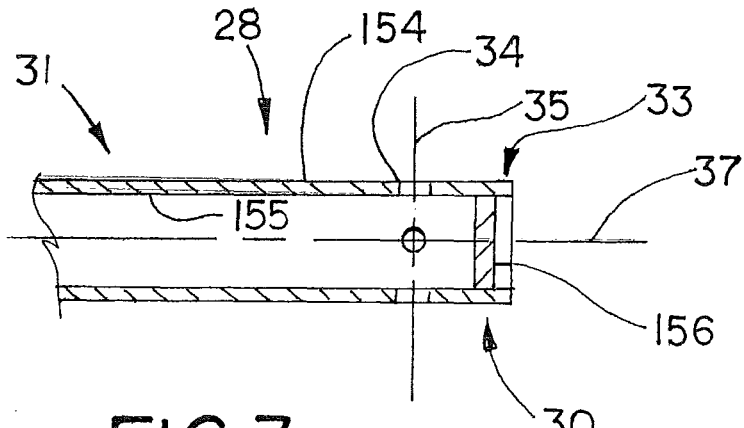
FIG. 3 is a partial side cross-sectional view of an embodiment of the sensing tube illustrated in FIGS. 1 and 3.

In the embodiment of the sensing tube 28 illustrated in FIGS. 2 and 3, one or more apertures 34 are disposed in the sensing tube 28 adjacent to the first end 30, and each of the one more apertures 34 has a centerline 35 that is perpendicular to the tube axis 37 and the flow axis 24. That is, each of the one or more apertures 34 extends from an outer surface 154 of the sensing tube 28 to an inner surface 155 of the sensing tube 28. So configured, each of the one or more apertures 34 is formed on or through a surface (i.e., the outer surface 154) that extends along or parallel to the flow axis 24 (or the tube axis 37). Each of the outer surface 154 and the inner surface 155 may extend along the tube axis 37 and each may be cylindrical, oval, or polygonal, for example. Any number of apertures 34 may be formed through the sensing tube 28. For example, at least three apertures 34 may be disposed in the sensing tube 28, and the at least three apertures 34 may be spaced at equal radial intervals around a circumference of the sensing tube 28. A centerline 35 of each of the at least three apertures 34 may be disposed in a reference plane that is normal to the tube axis 37 and/or the flow axis 24. In one embodiment, four apertures 34 may be formed in the sensing tube 28. The one or more apertures 34 may have any suitable shape, such as that of a circle or an oval (when viewed along the centerline 35) and may have any suitable size that allows for fluid to flow through the aperture 34 and into the control cavity 27.

The sensing tube 28 may include a vertical or substantially vertical end wall 156 disposed at or adjacent to the first end 30 of the sensing tube 28. The end wall 156 may be solid (i.e., non-porous) and may be adapted to prevent fluid flow into (and out of) the first end 30 of the sensing tube 28 along the tube axis 37 (and the flow axis 24). So configured, fluid flowing in the outlet may only enter the sensing tube 28 through the one or more apertures 34. Thus, fluid pressure may not be sensed longitudinally (i.e., along the tube axis 37) through the first end 30 of the sensing tube 28—rather, fluid pressure is sensed through the one or more apertures 34. By sensing pressure through apertures 34 extending normal to the tube axis 37, a low pressure zone adjacent to the apertures 34 is avoided, resulting in an accurate registration of pressure by the overpressure monitor 26.

Figure 5:
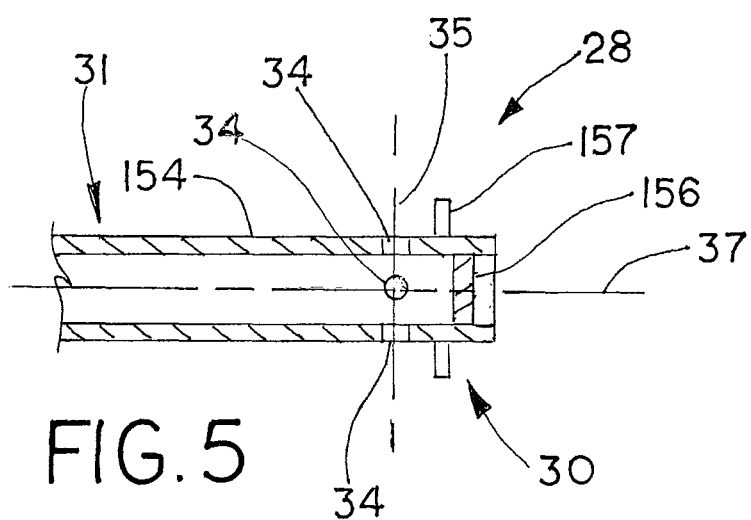
FIG. 5 is a partial side cross-sectional view of an additional embodiment of the sensing tube.

In the embodiment of the sensing tube 28 illustrated in FIG. 5, one or more projection members 157 may extend from the outer surface 154 of the sensing tube 28 adjacent to the first end 30. Each of the projection members 157 may extend normal or substantially normal to the tube axis 37 (and the flow axis 24). In addition, each of the projection members 34 may be disposed between the one or more apertures 34 and the second point 33 at the first end 30 of the sensing tube 28. So configured, a projection member 157 may be adjacent to a corresponding aperture 34 such that the number of projection members 157 equals the number of apertures 34. The projection members 157 may have any suitable shape adapted to create turbulence in the flow of fluid at or adjacent to a corresponding aperture 34. This turbulence improves the accuracy of the sensed pressure within the outlet 16 that is communicated to the overpressure monitor 26. As illustrated in FIG. 5, the projection members 157 may be elongated and may have a circular, polygonal, or oval cross-sectional shape.

Figure 4:
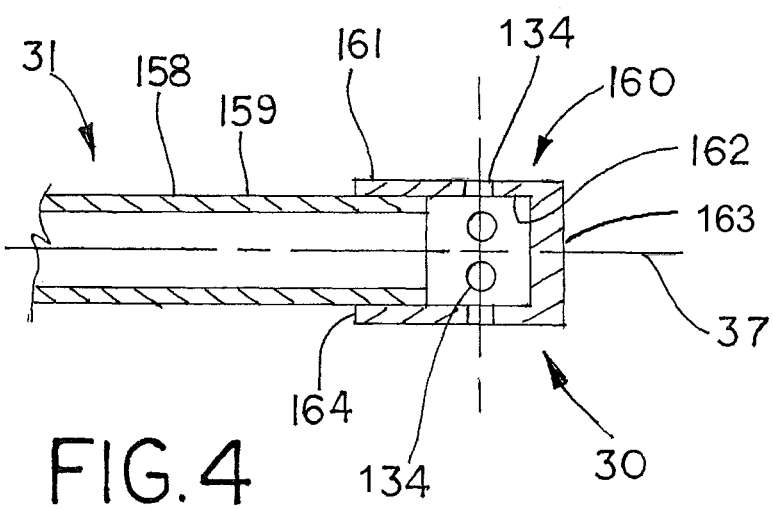
FIG. 4 is a partial side cross-sectional view of a further embodiment of the sensing tube.

In the embodiment of the sensing tube 28 illustrated in FIG. 4, at least a portion of the first portion 31 of the sensing tube 28 includes a base portion 158 having an outer surface 159, and the outer surface 159 may be cylindrical. The first portion 31 may also include a cap 160 that may be disposed at a terminal end of the base portion 158. The cap may have an outer surface 161 and an inner surface 162, and each of the outer 161 and inner surfaces 162 may be cylindrical. The inner surface 162 of the cap 160 may have a diameter that is slightly larger than the diameter of the outer surface 159 of the base portion 158 such that the terminal end of the base portion 160 is received into an interior of the cap 160 (i.e., such that a portion of the outer surface of the 159 of the base portion 158 is adjacent to or in contact with a portion of the inner surface 162 of the cap 160. The cap 160 may be secured to the base portion 158 in any manner known in the art, such as welding, adhesives, or an interference fit, for example.

The cap 160 of the sensing tube 28 may include a vertical or substantially vertical end wall 163 disposed at or adjacent to the first end 30 of the sensing tube 28 adjacent to an end portion of the cap 160. The end wall 163 may be solid (i.e., non-porous) and may be adapted to prevent fluid flow into (and out of) the first end 30 of the sensing tube 28 along the tube axis 37 (and the flow axis 24). Any number of apertures 134 may be formed through the cap 160, and the apertures 134 may be identical or substantially identical to the apertures 134 previously described. For example, at least three apertures 134 may be disposed in the cap 160, and the at least three apertures 134 may be spaced at equal radial intervals around a circumference of the cap 160. In one embodiment, six apertures 134 may be formed in the cap 160 of the sensing tube 28. A vertical surface 164 may extend between the outer surface 161 of the cap 160 and the outer surface 159 of the base portion 158, and the vertical surface 164 may be disposed between the one or more apertures 134 and the first point 32 of the first portion 31 of the sensing tube 28. The vertical surface 164 may be normal or substantially normal to the tube axis 37 or may be conical or frustoconical. The vertical surface 164 may be a projection member 157 adapted to create turbulence in the flow of fluid at or adjacent to a corresponding aperture 34. This turbulence improves the accuracy of the sensed pressure within the outlet 16 that is communicated to the overpressure monitor 26.

Figure 6:
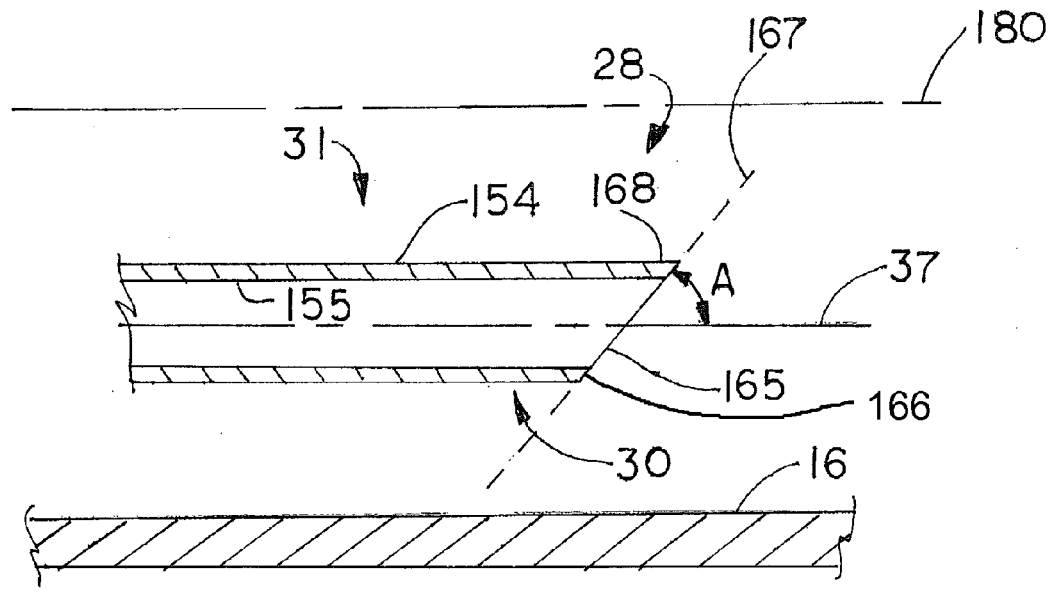
FIG. 6 is a partial side cross-sectional view of a further embodiment of the sensing tube.

In the embodiment of the sensing tube 28 illustrated in FIG. 6, the sensing tube 128 may be identical or substantially identical to the previously-described embodiments, but the sensing tube 28 may not include one or more apertures 34 extending normal to the tube axis 37. Instead, fluid can flow into an interior portion of the sensing tube 28 through an open first end 30, the open first end including a mouth portion 165. The mouth portion 165 may include an annular mouth surface 166 that that extends around the perimeter of the mouth portion between the outer surface 154 and the inner surface 155 of the first portion 31. The mouth surface 166 may be planar or may be at least partially contoured or rounded. The mouth surface 166 may be coplanar or substantially coplanar with a reference plane, and the reference plane may intersect the tube axis 37 to form an oblique angle (i.e., an angle less than 90 degrees). That is, when viewed normal to the tube axis 37, the reference plane may appear as a linear reference axis 167 that forms an oblique angle A with the tube axis 37. Specifically, the angle A between the reference axis 167 and the tube axis 37 may be between 10 degrees and 80 degrees, and preferably between 40 degrees and 55 degrees. So configured, the mouth portion 165 includes an acute portion 168 that is defined by the reference axis 167 and the outer surface 154 of the sensing tube 28 when viewed normal to the tube axis 37. When viewed normal to the tube axis 37, a tip of the acute portion 168 projects longitudinally forward of the sensing tube 28, and the acute portion 168 may be disposed on a lateral side of the sensing tube 28 closest to a centerline 180 of the outlet 16 (when viewed normal to the tube axis 37). So configured, a low pressure vortex at the first end 30 caused by fluid flow is prevented, thereby improving the accuracy of the sensed pressure within the outlet 16 that is communicated to the overpressure monitor 26.

Figure 7:
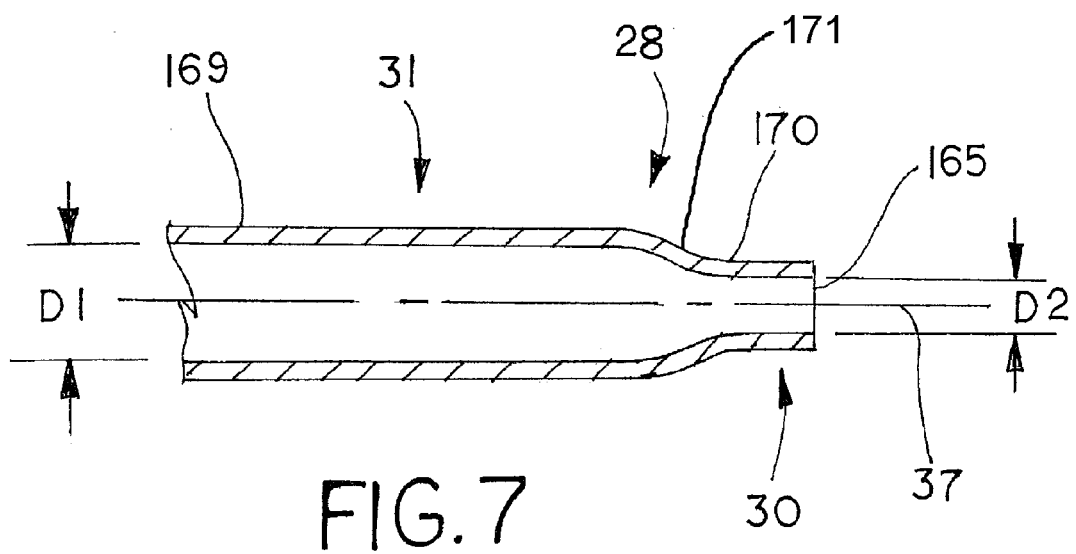
FIG. 7 is a partial side cross-sectional view of a further embodiment of the sensing tube.

In the embodiment of the sensing tube 28 illustrated in FIG. 7, the sensing tube 28 may be similar to the previously-described embodiments, but the sensing tube 28 does not have one or more apertures 34, 134. Instead, fluid can flow into an interior portion of the sensing tube 28 through an open first end 30. In the embodiment of FIG. 7, a first segment 169 of the first portion 31 may have a cylindrical shape having a first inner diameter D1 and a second segment 170 of the first portion 31 may have a cylindrical shape having a second diameter D2 that is different from the first diameter D1. For example, the first diameter D1 may be larger than the second diameter D2. More specifically, the first diameter D1 may be between two and four times larger than the second diameter D2. The second segment 170 may be adjacent to the first end 30 of the sensing tube 28. The sensing tube 28 may also include a transition segment 171 disposed between the first segment 169 and the second segment 170. The transition segment 171 may have a variable inner diameter that gradually reduces from the first diameter D1 to the second diameter D2 along the length of the transition segment 171. The first and second segments 169, 170 may have any suitable length. For example, a longitudinal length of the first segment 169 may be at least five times longer than a longitudinal length of the second segment 170. In addition, a longitudinal length of the second segment 170 may be between two and six times longer than the second diameter D2 of the second segment 170. So configured, a low pressure vortex at the first end 30 caused by fluid flow is prevented, thereby improving the accuracy of the sensed pressure within the outlet 16 that is communicated to the overpressure monitor 26.

Referring again to FIG. 1, the overpressure monitor 26 further includes a balancing spring 214 disposed between a spring seat 286 and a diaphragm retainer 292 biases a valve disc 222 to the normal open position. A coupler 272 and a control arm 276 are configured so that the coupler 272 only drives the control arm 276 in the direction to move the valve disc 222 toward the closed position and into engagement with the upstream side of the valve port 18 to cut off the fluid flow through the regulator valve 12. A pin 272a of the coupler 272 engages the free end 276b of the control arm 276 to rotate the control arm 276 when the diaphragm 248 and a piston 250 move upward due to a downstream pressure exceeding the cutoff pressure. Conversely, a top portion 272a of the coupler 272 is disposed remotely from the control arm 276 so the downward movement of the diaphragm 248 and piston 250 caused by decreases in the downstream pressure do not cause movement of the control arm 276. Of course, alternate configurations of overpressure monitors are known to those skilled in the art, including monitors configured to close when the downstream pressure drops below a low pressure cutoff, and are contemplated by the inventors as having use in gas regulators in accordance with the present disclosure.

When an operating demand is placed on the gas distribution system, e.g., a user begins operating an appliance such as a furnace, a stove, etc., the appliance draws gas from the outlet 16 and correspondingly the control cavity 44 of the actuator 20 and the control cavity 27 of the overpressure monitor 26, thereby reducing the pressure that is sensed by the diaphragms 58, 248. As the pressure sensed by the diaphragm 58 decreases, a force imbalance occurs between a control spring force and an outlet pressure force on the diaphragm 58 such that the control spring 62 expands and displaces the diaphragm 58 and piston 60 downward relative to the housing 42. This causes the control arm 108 to pivot in the clockwise direction, which in turn rotates the finger 113 relative to the surface of the actuator stem 112. This allows the actuator stem 112 and the valve disc 22 to move away from the outlet 125 of the valve port 18 due to the force of the balancing spring 148 to open the regulator valve 12. At the same time, the pressure decrease may also cause a force imbalance to occur between a control spring force and an outlet pressure force on the diaphragm 248 such that the control spring 252 expands and displaces the diaphragm 248 and piston 250 downward relative to the housing 230. However, because the upper portion of the coupler 272 is disposed remotely from the control arm 276, the overpressure monitor 26 does not similarly respond to the drop in pressure with movement of the valve disc 222.

When the demand is removed from the gas distribution system, such as when the user shuts off the appliance, the regulator 10 initially responds by decreasing the fluid flow through the regulator valve 12. As gas continues to flow through the valve port 18 and to the downstream portion of the system, the pressure increases at the outlet 16 and, correspondingly, in the control cavity 44 of the actuator 20 and the control cavity 27 of the overpressure monitor 26. As the pressure sensed by the diaphragm 58 increases and overcomes the control spring force, the diaphragm 58 and piston 60 are forced upward relative to the housing 42. The upward movement causes the control arm 108 to pivot in the counterclockwise direction, which in turn drives the actuator stem 112 and the valve disc 22 toward the valve port 18 to reduce the fluid flow through the regulator valve 12. Under normal operating conditions, the outlet pressure will drop to approximately the actuator setpoint pressure and remain there until the downstream demand changes in a manner that causes a response from by the actuator 20.

The monitor cutoff pressure is greater than the actuator setpoint pressure, and the overpressure monitor 26 does not typically respond to pressure variations within the normal operating range of the fluid regulating device 10. In the event of a failure of the actuator 20 such as, for example, the rupturing of the diaphragm 58, the valve disc 22 may remain open despite increases in the downstream pressure beyond the actuator setpoint pressure. Eventually, the pressure at the first end 30 of the sensing tube 28 reaches the cutoff pressure of the overpressure monitor 26. The downstream pressure communicated to the control cavity 27 by the sensing tube 28 causes a force imbalance to occur between the control spring force and the outlet pressure force on the diaphragm 248 such that the control spring 252 contracts and displaces the diaphragm 248 and piston 250 upward relative to the housing 230. When the piston 250 moves, the pin 272a of the coupler 272 rotates the control arm 276 to drive the actuator 278 and move the valve disc 222 into engagement with the valve port 18 to shut off the fluid flow through the regulator valve 12. The overpressure monitor 26 will continue to stop the fluid flow as long as the pressure at the first end 30 of the sensing tube 28 remains above the monitor cutoff pressure.

Figure 8:
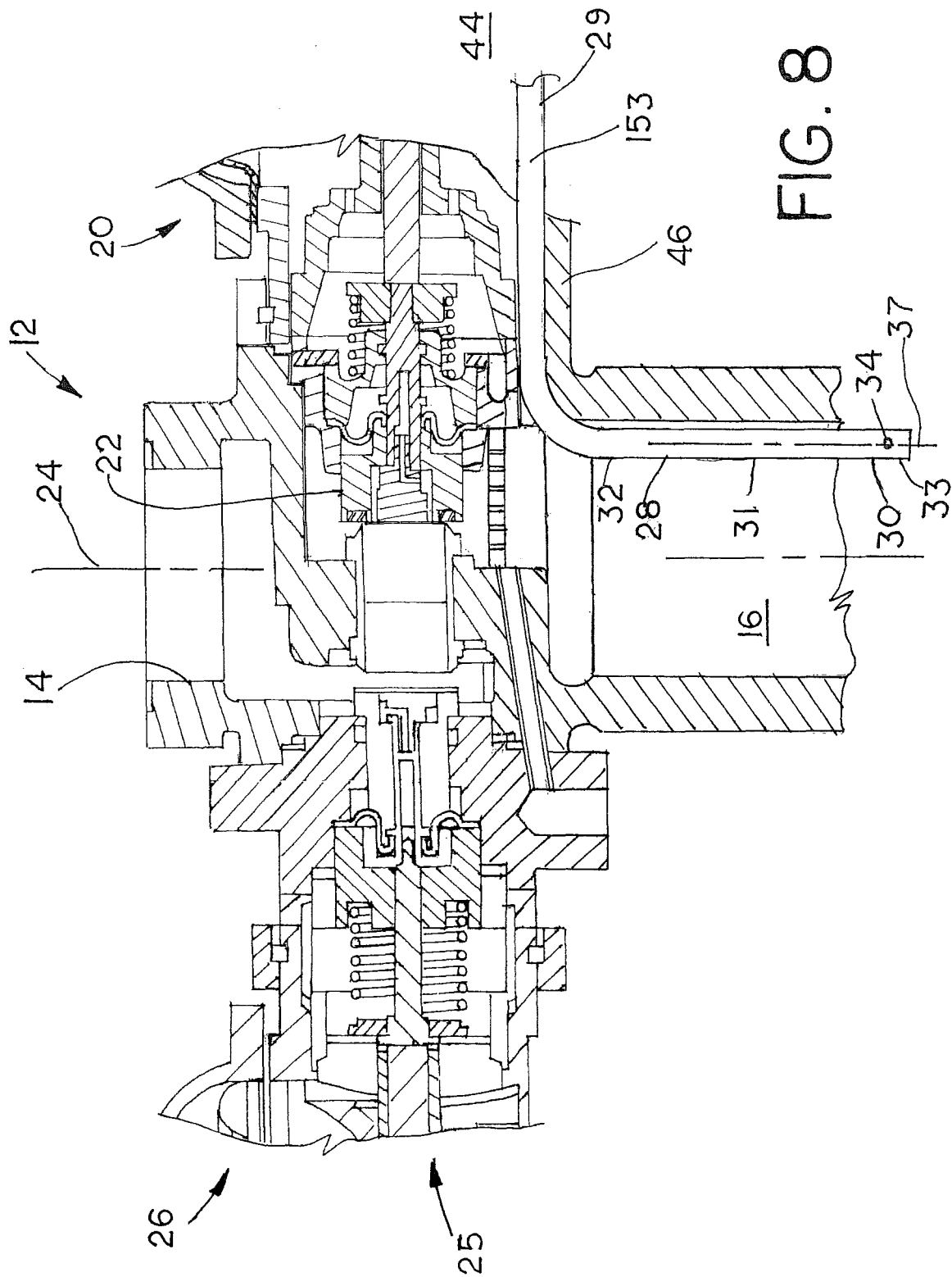
FIG. 8 is a partial side cross-sectional view of a sensing tube that extends from the outlet of the regulator valve to the control chamber of the actuator.

As illustrated in FIG. 8, an embodiment of the fluid regulating device 10 may have a sensing tube 28 adapted to sense pressure in a primary regulator (i.e., the actuator 20) instead of sensing pressure in an overpressure protection device 25. In this embodiment, the fluid regulating device 10 may or may not have an overpressure protection device 25, and an additional sensing tube 28 may be employed to sense pressure in the overpressure protection device 25 as previously described. The sensing tube 28 employed with the actuator 20 may be identical or substantially identical to the embodiments previously described. However, the second end 29 of the sensing tube 28 may be in fluid communication with the control cavity 44 of the actuator 20 and the first end 30 of the sensing tube 28 may be in fluid communication with the outlet 16 of the of the regulator valve 12 (or with the inlet 14 of the regulator valve 12). So configured, the control cavity 44 is in fluid communication with the outlet 16 (or inlet 14) of the of the regulator valve 12. The sensing tube 28 may have a first portion 31 that extends along a tube axis 37 that is parallel to or substantially parallel to the vertical flow axis 24. The first portion 31 extends from a first point 32 (disposed between the second end 29 of the sensing tube 28 and the first end 30 of the sensing tube 28) and a second point 33 (disposed at the first end 30 of the sensing tube), and the first point 32 is downstream of the first end 30. However, the orientation of the first portion 31 may be reversed such that the first point 32 is upstream of the first end 30. The first portion 31 may be disposed entirely within the outlet 16 of the regulator valve 12 or the first portion 31 may at least partially extend into a segment of pipe secured to the outlet 16.

Still referring to FIG. 8, the sensing tube 28 may have a second portion 153 that extends from the second end 29 of the sensing tube 28 to the first point 32 of the first portion 31 of the sensing tube 28. The second portion 153 may have any suitable shape or combination of shapes that allows the second end 29 of the sensing tube 28 to be in fluid communication with the control cavity 44 and that allows the second portion 153 to extend to the first point 32 of the first portion 31 of the sensing tube 28. For example, the second portion 153 may have a curved or substantially curved shape when viewed in cross section. Alternatively, one or more linear segments or one or more rounded or curved segments may cooperate to form the second portion 153. The second portion 153 may at least partially extend through the actuator mouth 46 of the actuator 20 at or adjacent to the interface between the actuator 20 and the actuator valve 12. The second portion 153 may also at least partially extend through a portion of the valve body 13 of the actuator valve 12 that defines the outlet 16 (or the inlet 14). The second portion 153 may also be defined as a channel (or a tube disposed within a channel) extending through the actuator mouth 46 of the actuator 20 and/or the valve body 13 of the actuator valve 12 that defines the outlet 16 or inlet 14 (or that is adjacent to the outlet 16 or inlet 14), and the first portion 31 may be secured to a portion of the valve body 13 of the actuator valve 12 that defines the outlet 16 or inlet 14 (or that is adjacent to the outlet 16 or inlet 14). In the manner previously described, the embodiments of the sensing tube 28 provide an accurate registration of pressure by the actuator 20.

While certain representative embodiments and details have been shown for purposes of illustrating the invention, it will be apparent to those skilled in the art that various changes in the methods and apparatus disclosed herein may be made without departing from the scope of the invention.

What is claimed:

1. A fluid regulating device, comprising:
    a regulator valve having a valve body defining an inlet and an outlet, the regulator valve further including a valve port disposed between the inlet and the outlet;
    an actuator coupled to the regulator valve and comprising a valve disc, the valve disc disposed within the regulator valve and adapted for displacement between a closed position sealingly engaging the valve port and an open position disposed away from the valve port, wherein in the open position, fluid flowing from the inlet to the outlet flows through the outlet along a flow axis;
    an overpressure protection device adapted to stop flow from the inlet to the outlet when pressure in a control cavity reaches a predetermined level, the overpressure protection device having a sensing tube, the sensing tube having a first end in fluid communication with the outlet of the regulator valve and a second end in fluid communication with the control cavity such that the control cavity is in fluid communication with the outlet of the of the regulator valve,
    wherein a first portion of the sensing tube extends along a tube axis that is parallel to the flow axis and wherein the first portion extends from a first point disposed between the first end and the second end and a second point disposed at the first end, and wherein one or more apertures are disposed in the sensing tube adjacent to the first end, each of the one or more apertures extending from an outer surface of the first portion to an inner surface of the first portion, wherein an outer diameter of the first end extends a first distance, and
    wherein at least three and at most four apertures are disposed in the sensing tube, and each of the apertures has a centerline, and each centerline of each of the apertures is disposed in a single reference plane that is normal to the tube axis and that is disposed a second distance along the tube axis from the first end of the sensing tube, wherein the second distance is less than twice the first distance.

2. The fluid regulating device of claim 1, wherein an end wall is disposed adjacent to the first end of the sensing tube, the end wall being adapted to prevent fluid flow into or out of the first end of the sensing tube along the tube axis.

3. The fluid regulating device of claim 2, wherein one or more projection members extend from an outer surface of the sensing tube adjacent to the first end of the sensing tube.

4. The fluid regulating device of claim 3, wherein the one or more projection members is disposed between the one or more apertures and the second point at the first end of the sensing tube.

5. The fluid regulating device of claim 1, wherein the at least three apertures are spaced at equal radial intervals around a circumference of the sensing tube.

6. The fluid regulating device of claim 1, wherein the overpressure protection device is an overpressure monitor.

* * * * *